United States Patent [19]
Gotou et al.

[11] Patent Number: 6,040,581
[45] Date of Patent: Mar. 21, 2000

[54] GAMMA-RAY COMPENSATED NEUTRON IONIZATION CHAMBER

[75] Inventors: Toyokazu Gotou; Shinji Fukakusa, both of Tokyo, Japan

[73] Assignee: Mitsubishi Denki Kabushiki Kaisha, Tokyo, Japan

[21] Appl. No.: 09/084,879

[22] Filed: May 28, 1998

[30] Foreign Application Priority Data

Dec. 17, 1997 [JP] Japan ................................ 9-348189

[51] Int. Cl.$^7$ .............................................. G01T 3/00
[52] U.S. Cl. .................................. 250/390.01; 250/385.1
[58] Field of Search ............................. 250/374, 385.1, 250/390.01, 392, 472.1, 475.2; 376/154, 254, 255, 287

[56] References Cited

U.S. PATENT DOCUMENTS 5,326,977  7/1994  Oda ................................ 250/390.01

FOREIGN PATENT DOCUMENTS 4363856  12/1992  Japan .

*Primary Examiner*—Constantine Hannaher
*Assistant Examiner*—Otilia Gabor
*Attorney, Agent, or Firm*—Rothwell, Figg, Ernst & Kurz

[57] ABSTRACT

To eliminate deterioration in the saturation characteristics of gamma-rays, the total area of holes formed in a signal electrode which is arranged within a high-voltage electrode concentrically is set to a value equal to or smaller than 5% of the surface area of the signal electrode.

3 Claims, 6 Drawing Sheets

FIG. 5

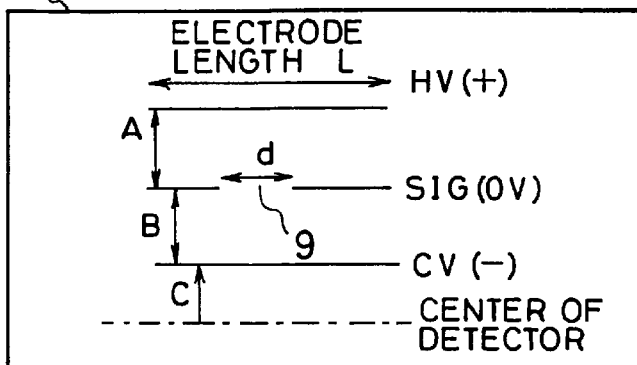

101

102
DETERMINING CV DIAMETER SO THAT VOLUME OF (HV_SIG) IS EQUAL TO VOLUME OF (SIG_CV)

103
THE LENGTH OF LEAKAGE FIELD OF EACH HOLE IS OBTAINED FROM THE FOLLOWING EQUATION IF THE ELECTRODES ARE FLAT PLATES PARALLEL TO ONE ANOTHER. (HV IS HIGH VOLTAGE AND CV IS COMPENSATING VOLTAGE)

$$e = \frac{HV}{HV-(-CV)} \times (A+B) - A \quad \cdots (1)$$

104
VOLTAGE V BETWEEN ELECTRODES IS OBTAINED FROM THE FOLLOWING EQUATION. (d IS THE DIAMETER OF EACH HOLE AND f IS A CO-EFFICENT DETERMINED BY THE SHAPE OF LEAKAGE FIELD (FUNCTION OF VOLTAGE)

$$V = f \times (d^2/4)\pi e \times (\text{NUMBER OF HOLES}) \cdots (2)$$

105
THE EFFECTIVE VOLUMES OF IONIZATION CHAMBERS ARE OBTAINED AS FOLLOWS.
EFFECTIVE VOLUME OF HV_SIG = VOLUME OF(HV_SIG)+V
EFFECTIVE VOLUME OF SIG_CV = VOLUME OF(SIG_CV)-V

106
POINT WHERE EFFECTIVE VOLUMES ARE EQUAL TO EACH OTHER IS OBTAINED BY CHANGING DISTANCE B

GAMMA-RAY COMPENSATED NEUTRON IONIZATION CHAMBER

BACKGROUND OF THE INVENTION

1. Field of the Invention

This invention relates to a gamma-ray compensated neutron ionization chamber for measuring only the neutron flux in the presence of gamma-rays in a nuclear reactor or the like.

2. Description of the Prior Art

FIG. 7 shows a gamma-ray compensated neutron ionization chamber in which holes are formed in a signal electrode as disclosed in Japanese Laid-open Patent Application No. Hei 4-363856. In FIG. 7, reference numeral 1 denotes a cylindrical high-voltage electrode, 2 a cylindrical signal electrode arranged concentrically within the high-voltage electrode with predetermined spacing therebetween, 3 a cylindrical compensating electrode arranged concentrically within the signal electrode 2 with predetermined spacing therebetween, 4 a high-voltage power source for applying a high voltage +VH to the high-voltage electrode 1, 5 a compensating power source for applying a compensating voltage −VC to the compensating electrode 3, 6 an amplifier for amplifying a neutron current obtained from the signal electrode 2, 7 a neutron sensitive substance such as $10_B$, coated on the inner surface (surface facing the signal electrode 2) of the high-voltage electrode 1, 8 a neutron sensitive substance such as $10_B$ coated on the outer surface(surface facing the high-voltage electrode 1) of the signal electrode 2, 10 a neutron ionization chamber which is ionization space between the high-voltage electrode 1 and the signal electrode 2, 11 a compensated ionization chamber which is ionization space between the signal electrode 2 and the compensating electrode 3, and 12 a plurality of holes formed in the signal electrode 2. These holes 12 are arranged in peripheral and axial directions of the signal electrode 2 as shown in FIG. 8.

The above publication discloses an example in which 48 holes 12 having a diameter of 5 mm are formed but does not mention limitations on the diameter of each hole, the number of holes and the distance between hole axes (distance between adjacent holes). However, as the volume of a leakage electric field produced by each of the holes 12 correspond to the width of gamma-ray compensation, the volume of the leakage electric field is desirably controlled to a value equal to or smaller than several percents of the volume of the neutron ionization chamber 10. This is because a change in signal current at a voltage near use voltage is desirably as small as possible when neutrons and gamma-rays remain unchanged and must be 5%/100 V (this means that a signal change is 5% or less when the use voltage is changed by 100 V). When the area of the hole 12 is large, a change in signal current is large and the gamma-ray compensated neutron ionization chamber cannot be used. The saturation characteristics of the neutron ionization chamber 10 will be described with reference to FIG. 2. In FIG. 2, P shows when there are no holes 12 in the signal electrode 2, Q shows when the total area of the holes 12 in the signal electrode 2 is 5% of the surface area of the signal electrode 2, and R shows when the total area of the holes 12 in the signal electrode 2 is 10% of the surface area of the signal electrode 2. It is understood from FIG. 2 that when the total area of the holes 12 is larger than 5% of the surface area of the signal electrode 2, deterioration in saturation characteristics becomes marked, which is a problem in practical application. The surface area of the signal electrode 2 is the surface area on either one of a high-voltage electrode 1 side and a compensating electrode 3 side of the signal electrode 2.

In the gamma-ray compensated neutron ionization chamber of the prior art, saturation characteristics deteriorate in proportion to the total area of the holes 12 because the neutron ionization chamber 10 and the compensated ionization chamber 11 are not sealed hermetically as described above. When the volume of a leakage electric field produced by each of the holes 12 increases, the width of gamma-ray compensation expands with the result of a growing signal change (signal error).

As shown in FIG. 9, when the interval W2 between hole axes which is the distance between adjacent holes 12 is set to a value smaller than the interval between the signal electrode 2 and the compensating electrode 3, that is, the thickness D of the compensated ionization chamber 11 (W2<D), the leakage electric fields E2 of the holes 12 form a continuous waveform distribution. The volume of the leakage electric field is larger than that when the effect of each of the holes 12 is evaluated independently, thereby causing such a problem as a growing signal change.

As shown in FIG. 10, a hole 13 corresponding to the hole 12 is formed tapered. That is, when the hole is formed such that its diameter becomes smaller towards the compensating electrode 3 side from the high-voltage electrode 1 side, a portion 14a where the wall surface 13a of the hole intersects the outer surface (surface facing the signal electrode 1) of the signal electrode 2 and a portion 14b where the wall surface 13a of the hole intersects the inner surface 2b (surface facing the compensating electrode 3) of the signal electrode 2 form an edge. Particularly, the portion 14b where an angle formed by the wall surface 13a and the inner surface 2b is acute forms a shape edge. In this case, as shown in FIG. 11, the concentration of fields E3 readily occurs in the sharp edged portion 14b, and changes in leakage electric field produced by each of the holes 13 are sharp and readily affected by changes in compensating voltage. In addition, to evaluate the effect of each of the holes 13 independently, the interval W2 between hole axes shown in FIG. 9 must be made large, thereby making more strict limitations on the interval W2 of hole axes.

SUMMARY OF THE INVENTION

The present invention has been made to solve the above problems and it is an object of the present invention to provide a gamma-ray compensated neutron ionization chamber which can suppress deterioration in saturation characteristics to such a degree that it can be virtually ignored and has small dependence on the dose and energy of gamma-rays.

According to a first aspect of the present invention, there is provided a gamma-ray compensated neutron ionization chamber comprising a cylindrical or plate-like high-voltage electrode to which a high voltage is applied, a cylindrical or plate-like signal electrode for taking out a neutron current, and a cylindrical. or plate-like compensating electrode to which a compensating voltage is applied, these electrodes being arranged concentrically. in the order named with predetermined spacing therebetween, and a plurality of holes being formed in part of the signal electrode, wherein the total area of the holes is set to a value equal to or smaller than 5% of the surface area of the signal electrode.

According to a second aspect of the present invention, there is provided a gamma-ray compensated neutron ionization chamber, wherein the distance between adjacent holes is set to a value equal to or larger than 2 times the distance between the signal electrode and the compensating electrode.

According to a third aspect of the present invention, there is provided a gamma-ray compensated neutron ionization chamber, wherein portions where a hole in the signal electrode intersects both surfaces of the signal electrode are formed into curved surfaces.

The above and other objectives, features and advantages of the invention will become more apparent from the following description when taken in conjunction with the accompanying drawings.

BRIEF DESCRIPTION OF THE DRAWINGS

FIGS. 1(a) and 1(b) show an embodiment of the present invention wherein FIG. 1(a) is a structural diagram of a gamma-ray compensated neutron ionization chamber and FIG. 1(b) is a sectional view of a signal electrode around one hole;

FIG. 5 is a flow chart showing a design process in the above embodiment of the present invention;

DETAILED DESCRIPTION OF THE PREFERRED EMBODIMENT

Figure 1A:
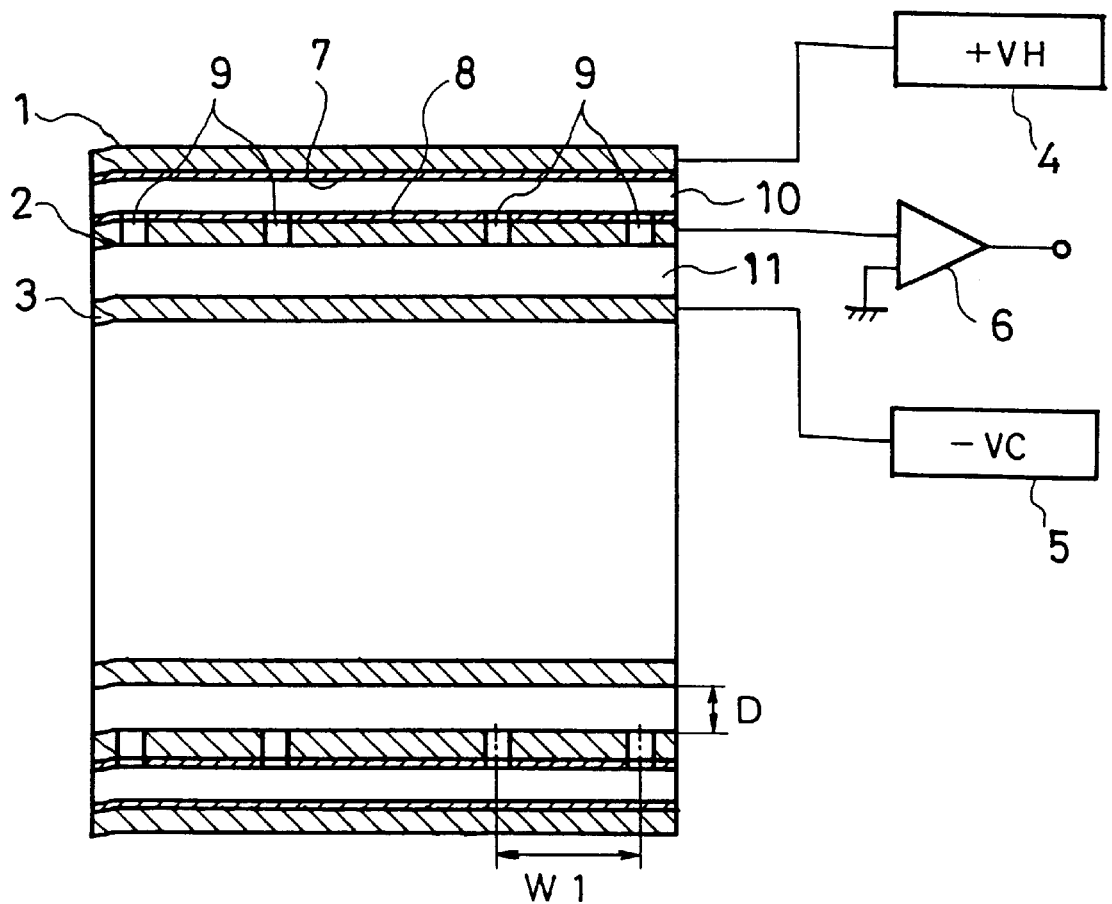
Figure 1B:
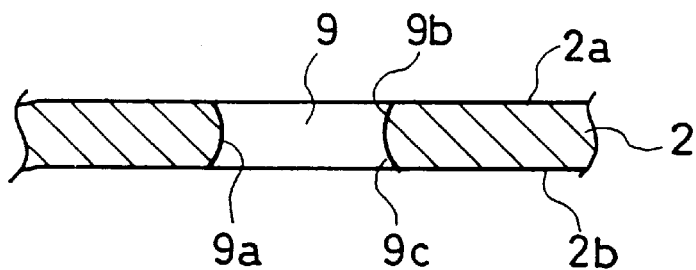

A preferred embodiment of the present invention will be described hereinunder. FIGS. 1(a) and 1(b) show an embodiment of the present invention. FIG. 1(a) shows typically the cross section of a gamma-ray compensated neutron ionization chamber when cut along the axial center thereof and FIG. 1(b) is an enlarged view of a portion around a single hole in the signal electrode of the gamma-ray compensated neutron ionization chamber. In FIG. 1(a), the high-voltage electrode 1, signal electrode 2, compensating electrode 3, high-voltage power source 4, compensating power source 5, amplifier 6, neutron sensitive substances 7 and 8, neutron ionization chamber 10 and compensated ionization chamber 11 are the same as those in the prior art. Reference numeral 9 denotes a plurality of holes formed in the signal electrode 2 and the total area of the holes 9 is set to a value equal to or smaller than 5% of the surface area of the signal electrode 2. The surface area of the signal electrode 2 is the surface area on either one of a high-voltage electrode 1 side and a compensating electrode 3 side as described above. Further, the interval W1 between hole axes which is the distance between adjacent holes 9 is set to a value equal to or more than 2 times the interval between the signal electrode 2 and the compensating electrode 3, that is, the distance D of the compensated ionization space 11 (W1≧2·D). The interval W1 between hole axes is the interval between hole axes in the axial direction of the signal electrode 2 in FIG. 1(a). However, since a plurality of holes 9 are formed in peripheral and axial directions of the cylindrical signal electrode 2, when attention is paid to the relationship between one hole 9 as a reference and holes 9 arranged therearound, the interval W1 also comprehends the interval in a peripheral direction and the interval in a direction intersecting the peripheral direction and the axial direction of the cylindrical signal electrode 1. Further, as shown in FIG. 1(b), portions where the wall surface 9a of the hole 9 intersects the outer surface 2a and inner surface 2b of the signal electrode 2 are formed into curved surfaces 9b and 9c along the entire periphery of the hole 9, respectively. These curved surfaces 9b and 9c are made smooth and continuous with each other by polishing without forming edges between the outer surface 2a and the wall surface 9a and between the inner surface 2b and the wall surface 9a, respectively.

Figure 2:
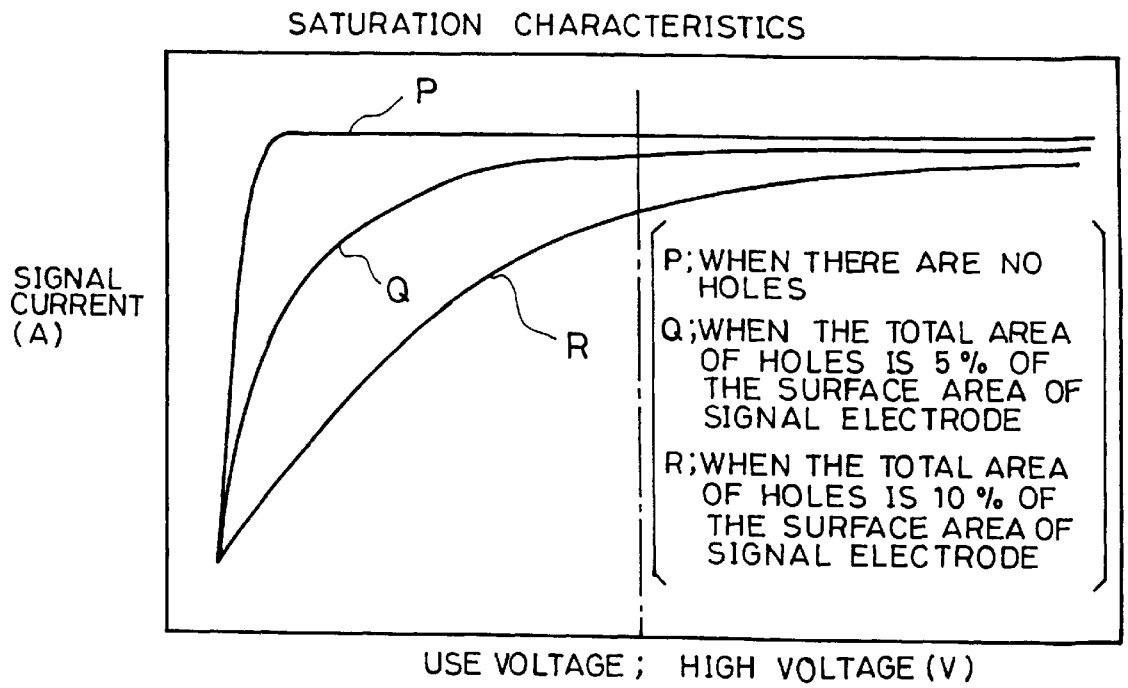
FIG. 2 is a graph showing saturation characteristics in the above embodiment of the present invention.

In this embodiment of the present invention, since the total area of the holes 9 is set to a value equal to or smaller than 5% of the surface area of the signal electrode 2, the saturation characteristics of the neutron ionization space 10 can be kept satisfactory because they are present in a section from the curve Q toward the curve P in FIG. 2.

Figure 3:
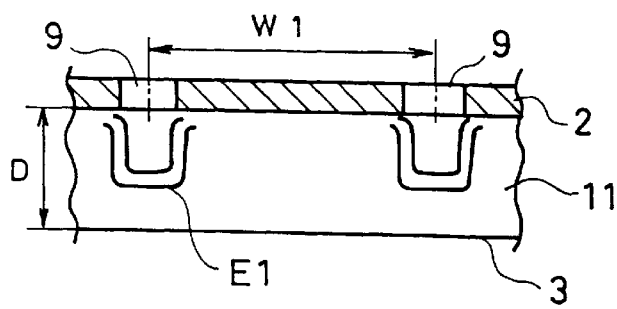
FIG. 3 is a sectional view for explaining the function of the interval between hole axes in the above embodiment of the present invention.

In this embodiment of the present invention, since the leakage electric field of each hole 9 can be taken into account independently by setting the distance W1 between adjacent holes 9 to a value equal to or larger than 2 times the interval D between the signal electrode 2 and the compensating electrode 3 (W1≧2·D), design becomes easy, the relationship between compensating voltage and the volume of a leakage electric field becomes almost linear, and the change rate of compensation characteristics can be minimized. A description is given of (W1≧2·D) with reference to FIG. 3. FIG. 3 shows the results of simulation and experiments conducted by the inventor of the present invention, that is, the leakage electric field E1 of the hole 9 when (W1≧2·D). According to FIG. 3, the leakage electric field E1 of each of the holes 9 is an independent distribution. Therefore, it is obvious from FIG. 3 that the effect of each of the holes 9 can be taken into account independently by setting the distance W1 between adjacent holes 9 to a value equal to or larger than the distance D between the signal electrode 2 and the compensating electrode 3.

Figure 4:
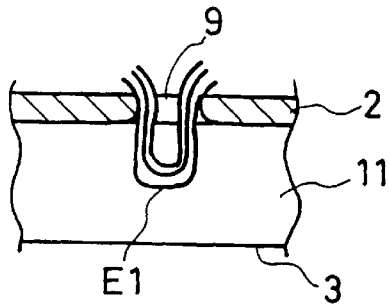
FIG. 4 is a sectional view for explaining the function of curved surfaces in the above embodiment of the present invention.

Further, in this embodiment, since a portion where the wall surface 9a of the hole 9 intersects the outer surface 2a of the signal electrode 2 and a portion where the wall surface 9a of the hole 9 intersects the inner surface 2b of the signal electrode 2 are formed into curved surfaces 9b and 9c, respectively, the gamma-ray compensated neutron ionization chamber is free from sharp changes in field and hardly affected by changes in compensating voltage. The curved surfaces 9b and 9c will be described with reference to FIG. 4. FIG. 4 shows the results of simulation and experiments conducted by the present inventor that there are no sharp changes in field E1. Therefore, it is obvious from FIG. 4 that since portions where the wall surface 9a of the hole 9 intersects the outer surface 2a and the inner surface 2b are formed into curved surfaces 9b and 9c, respectively, the gamma-ray compensated neutron ionization chamber is hardly affected by changes in compensating voltage.

FIG. 5 shows a process for designing a gamma-ray compensated neutron ionization chamber according to this embodiment of the present invention. Step 101 in FIG. 5 shows models of a high-voltage electrode HV(+) corresponding to the high-voltage electrode 1, a signal electrode SIG(0 V) corresponding to the signal electrode 2 and a compensating electrode CV(−) corresponding to the compensating electrode 3. In step 101, A is the distance between the high-voltage electrode HV(+) and the signal electrode SIG(0 V), that is, the thickness of the neutron ionization chamber 10, B is the distance between the signal electrode SIG(0 V) and the compensating electrode CV(−), that is, the thickness of the compensated ionization chamber 11, C is the distance between the center of a detector, that is, a center line where the high-voltage electrode 1, the signal electrode 2 and the compensating electrode 3 become concentrical with one another and the compensating electrode CV(−), d is the diameter of the hole 9, and L is the electrode length of the high-voltage electrode HV(+), the signal electrode SIG(0 V) and the compensating electrode CV(−). In step 102, C is determined to ensure that the volume of HV_SIG (volume of the neutron ionization chamber 10) should be equal to the volume of SIG_CV (volume of the compensated ionization chamber 11), and then the routine proceeds to step 103. In step 103, when a high voltage applied to the high-voltage electrode HV(+) is represented by HV and a compensating voltage applied to the compensating electrode CV(−) is represented by CV, the length e of a leakage electric field in the hole 9 is obtained from the equation (1) shown in step 103 if the high-voltage electrode HV(+), the signal electrode SIG(0 V) and the compensating electrode CV(−) are flat plates parallel to one another, and the routine proceeds to step 104. In step 104, a voltage V between electrodes corresponding to a potential between the high-voltage electrode HV(+) and the signal electrode SIG(0 V) and a potential between the signal electrode SIG(0 V) and the compensating electrode CV(−) is obtained based on the diameter d of the hole 9 and the number N of the holes from the equation (2) shown in step 104, and the routine proceeds to step 105. In step 105, the effective volumes of the neutron ionization chamber 10 and the compensated ionization chamber 11 are obtained from the following equations, respectively. effective volume of HV_SIG=volume of HV_SIG+V effective volume of SIG_CV=volume of SIG_CV−V Then, the routine proceeds to step 106. In step 106, a point where the effective volume of HV_SIG is equal to the effective volume of SIG_CV is obtained by changing the distance B shown in step 101. By the above process, a gamma-ray compensated neutron ionization chamber which is compensated 100% when the compensating potential is −CV can be designed. The design is actually carried out using coaxial cylindrical models by adding the calculation of the thickness of each electrode and f. A detector for the gamma-ray compensated neutron ionization chamber is formed by the high-voltage electrode HV(+), the signal electrode SIG(0 V) and the compensating electrode CV(−).

Figure 6:
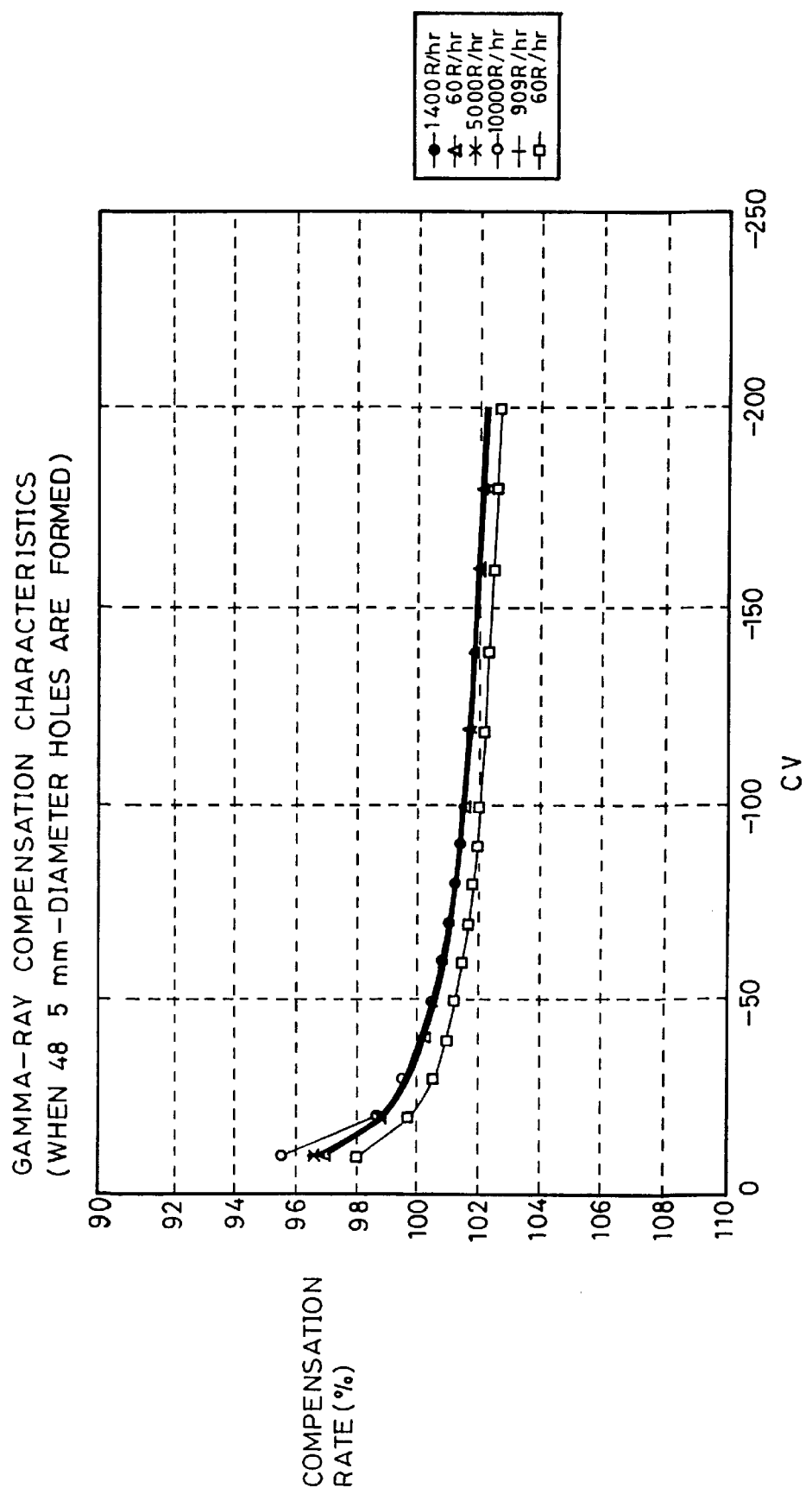
FIG. 6 is a graph showing actual measurement data on gamma-ray compensation characteristics in the above embodiment of the present invention.
Figure 7:
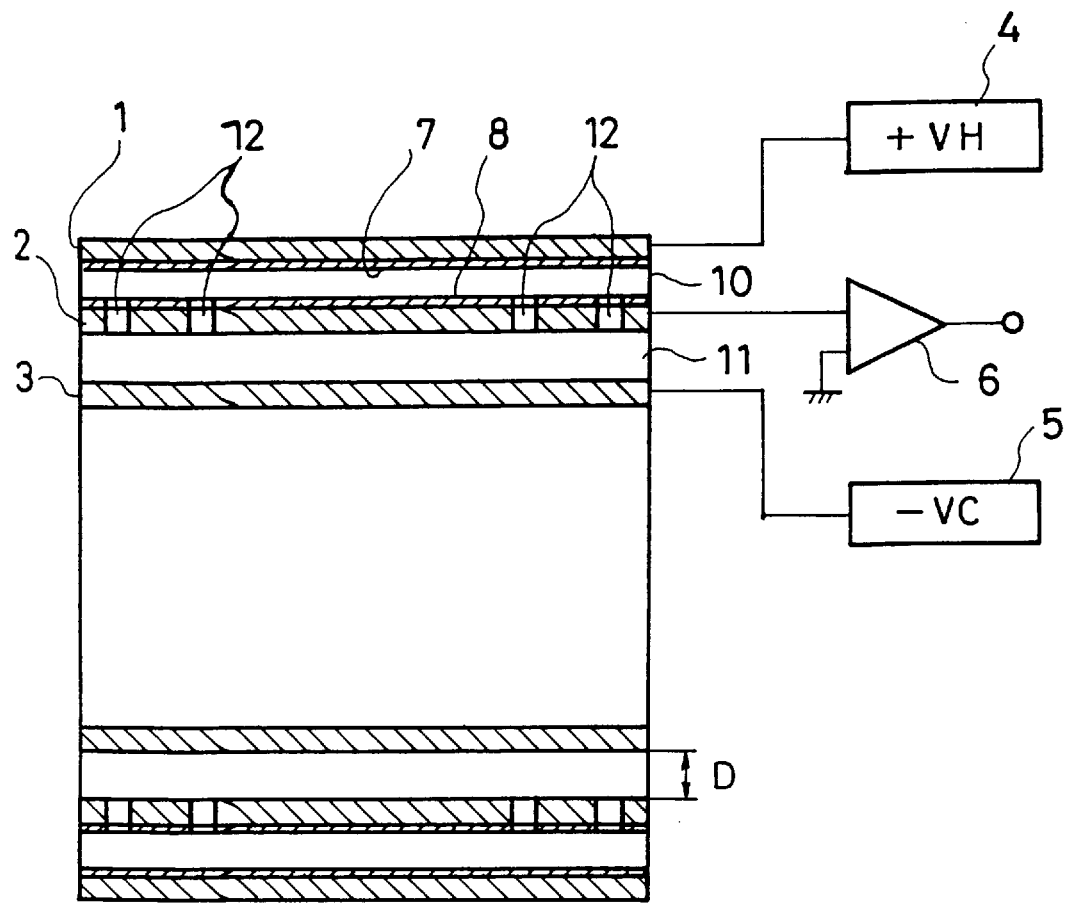
FIG. 7 is a structural diagram of a gamma-ray compensated neutron ionization chamber of the prior art.
Figure 8:
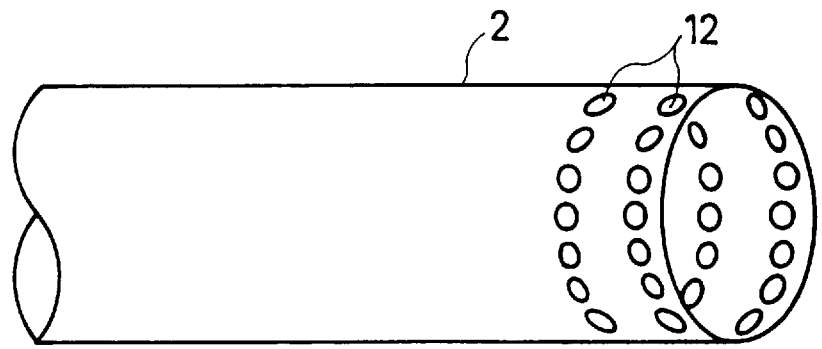
FIG. 8 is a perspective view of the arrangement of holes in the signal electrode of the prior art.
Figure 9:
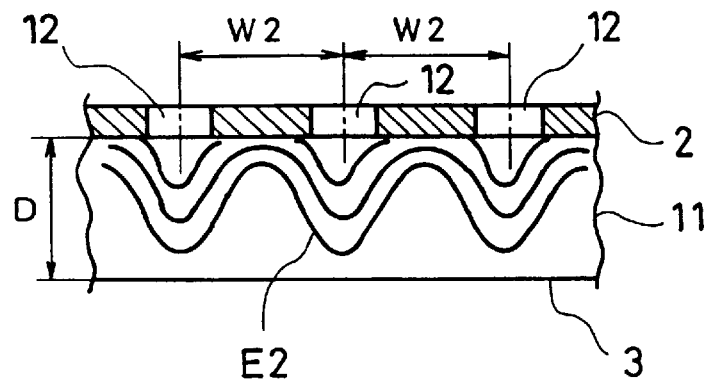
FIG. 9 is a sectional view for explaining the function of the interval of hole axes in the prior art.
Figure 10:
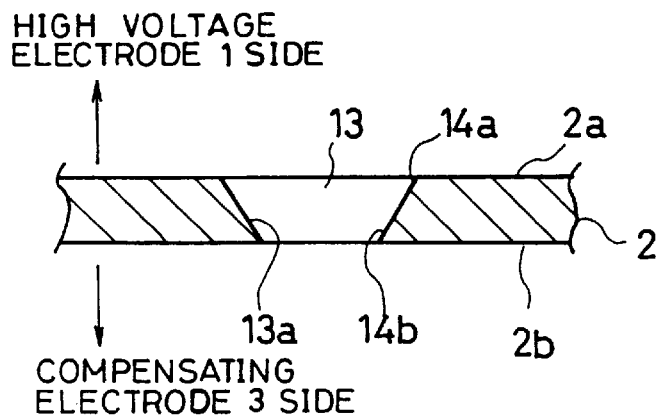
FIG. 10 is a sectional view of the shape of a different hole in the signal electrode of the prior art.
Figure 11:
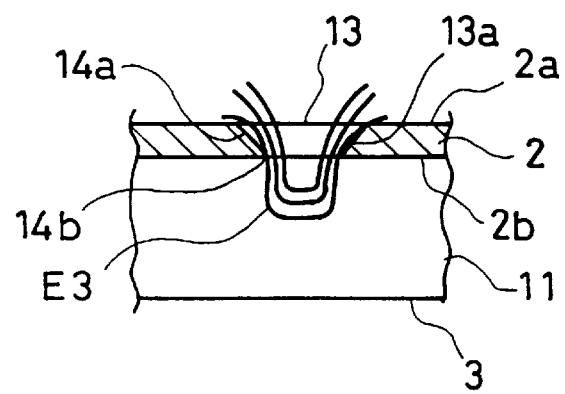
FIG. 11 is a sectional view for explaining the function of the above different hole in the signal electrode of the prior art.

FIG. 6 shows actual measurement data on gamma-ray compensation characteristics when a gamma-ray compensated neutron ionization chamber having 48 holes 9 with a diameter of 5 mm according to this embodiment of the present invention is irradiated with cobalt 60. In FIG. 6, 60R/hr* indicated by □ shows compensation characteristics obtained when a lead block is placed between a cobalt beam source and a detector to make soft the quality of the beam. It is seen from the actual measurement data that changes in compensation characteristics are small even when the dose rate of gamma-rays are greatly changed and that a detector having extremely small dependence on the dose and the energy of the beam of gamma-rays can be provided.

As described above, according to the first aspect of the present invention, since the total area of the holes is set to a value equal to or smaller than 5% of the surface area of the signal electrode, a gamma-ray compensated neutron ionization chamber which can suppress deterioration in saturation characteristics to such a degree that it can be virtually ignored and has small dependence on the dose and quality of gamma-rays can be provided.

According to the second aspect of the present invention, since the distance between adjacent holes is set to a value equal to or larger than 2 times the distance between the signal electrode and the compensating electrode, the leakage electric field of each of the holes can be taken into account independently, in addition to the effect of the first aspect. Therefore, design is made easy, the relationship between compensating voltage and the volume of the leakage electric field becomes almost linear, and the change rate of compensation characteristics can be minimized.

According to the third aspect of the present invention, since portions where a hole in the signal G electrode intersects the surfaces of the signal electrode are formed into curved surfaces, the gamma-ray compensated neutron ionization chamber is free from sharp changes in field and hardly affected by changes in compensating voltage, in addition to the effects of the first and second aspects.

What is claimed is:

1. A gamma-ray compensated neutron ionization chamber comprising a cylindrical or plate-like high-voltage electrode to which a high voltage is applied, a cylindrical or plate-like signal electrode for taking out a neutron current, and a cylindrical or plate-like compensating electrode to which a compensating voltage is applied, these electrodes being arranged concentrically in the order named with predetermined spacing therebetween, and a plurality of holes being formed in part of the signal electrode, wherein the total area of the holes is set to a value equal to or smaller than 5% of the surface area of the signal electrode.

2. The gamma-ray compensated neutron ionization chamber of claim 1, wherein the distance between adjacent holes is set to a value equal to or larger than 2 times the distance between the signal electrode and the compensating electrode.

3. The gamma-ray compensated neutron ionization chamber of claim 1, wherein portions where a hole in the signal electrode intersects both surfaces of the signal electrode are formed into curved surfaces.

* * * * *